US012639933B2

(12) United States Patent
Pirlo et al.

(10) Patent No.: US 12,639,933 B2
(45) Date of Patent: May 26, 2026

(54) METHOD FOR VERIFYING AN IMPLEMENTED NEURAL NETWORK

(71) Applicant: Robert Bosch GmbH, Stuttgart (DE)

(72) Inventors: Nicola Pirlo, Stuttgart (DE); Paul Ruhnau, Leonberg-Hoefingen (DE); Christopher Braunholz, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 373 days.

(21) Appl. No.: 18/256,923

(22) PCT Filed: Dec. 14, 2021

(86) PCT No.: PCT/EP2021/085609
§ 371 (c)(1),
(2) Date: Jun. 12, 2023

(87) PCT Pub. No.: WO2022/128992
PCT Pub. Date: Jun. 23, 2022

(65) Prior Publication Data
US 2024/0029418 A1 Jan. 25, 2024

(30) Foreign Application Priority Data
Dec. 14, 2020 (DE) .................... 10 2020 215 779.0

(51) Int. Cl.
*G06V 10/776* (2022.01)
*G06V 10/82* (2022.01)
*G06V 20/56* (2022.01)

(52) U.S. Cl.
CPC ............ *G06V 10/776* (2022.01); *G06V 10/82* (2022.01); *G06V 20/56* (2022.01)

(58) Field of Classification Search
CPC ....... G06V 10/776; G06V 10/82; G06V 20/56
See application file for complete search history.

(56) References Cited

U.S. PATENT DOCUMENTS

2014/0289445 A1*  9/2014  Savich ................... G06F 17/16
                                               710/317
2019/0362200 A1   11/2019  Jang et al.
2021/0110289 A1*   4/2021  Castro-Schilo .......... G06N 7/00

FOREIGN PATENT DOCUMENTS

CN        111868752 A     10/2020

OTHER PUBLICATIONS

Pei, K., Cao, Y., Yang, J., & Jana, S. (Oct. 2017). Deepxplore: Automated whitebox testing of deep learning systems. In proceedings of the 26th Symposium on Operating Systems Principles (pp. 1-18). (Year: 2017).*

(Continued)

*Primary Examiner* — David Perlman
(74) *Attorney, Agent, or Firm* — Maginot, Moore & Beck LLP

(57) ABSTRACT

A method is for verifying an implemented neural network and includes providing a plurality of validation images, feeding the plurality of validation images to an original neural network, feeding the plurality of validation images to the implemented neural network, and determining an activation coverage of the original neural network using all of the validation images of the provided plurality of validation images. The method further includes comparing the determined activation coverage with a target coverage, and comparing respective output images of the original neural network resulting from the plurality of validation images, with respective output images of the implemented neural network resulting from the plurality of validation images, in order to verify the implemented neural network.

13 Claims, 3 Drawing Sheets

(56) References Cited

OTHER PUBLICATIONS

International Search Report corresponding to PCT Application No. PCT/EP2021/085609, mailed Apr. 8, 2022 (German and English language document) (4 pages).

Tian et al., "DeepTest: Automated Testing of Deep-Neural-Network-Driven-Autonomous Cars," Aug. 28, 2017, XP055462222 (12 pages).

Ma et al., "DeepGauge: Multi-Granularity Testing Criteria for Deep Learning Systems," Proceedings of the 33rd ACM/IEEE International Conference on Automated Software Engineering, ASE 2018, ACM Press, Sep. 3, 2018, XP058415234 (12 pages).

Wenzler, Nils., "Not all Neurons are created equal: Towards a feature level Deep Neural Network Test Coverage Metric", 2019, University of Toronto, Toronto, Canada (8 pages).

Nguyen et al., "Understanding Neural Networks via Feature Visualization: A survey", Apr. 18, 2019 (23 pages).

"Knowledge distillation", Wikipedia, https://en.wikipedia.org/w/index.php?title=Knowledge-distikkation&oldid=992008567, Dec. 2020 (4 pages).

* cited by examiner a)

b)

METHOD FOR VERIFYING AN IMPLEMENTED NEURAL NETWORK

This application is a 35 U.S.C. § 371 National Stage Application of PCT/EP2021/085609, filed on Dec. 14, 2021, which claims the benefit of priority to Serial No. DE 10 2020 215 779.0, filed on Dec. 14, 2020 in Germany, the disclosures of which are incorporated herein by reference in their entirety.

BACKGROUND

Machine learning methods, especially deep learning, are becoming increasingly important in the field of automated driving. Neural networks are increasingly used in particular in the field of environmental perception, with sensors installed in the vehicle.

Typically, developing a neural network for an embedded platform, for example, involves various tool chains, including various tools for training/assessment and deployment. Using a network training and evaluation tool chain, a generated and trained neural network can be defined, which is finally transferred to a target system using a command list/execution description. In a target system with an embedded special processor (embedded hardware), for example using assembly language or machine instructions.

Requirements for such a system usually relate to electrical power consumption, required resources such as bandwidths, runtimes and memory requirements, and permitted interactions with other systems or components with which resources are shared.

While freedom from interference and resource consumption can usually be checked directly on the embedded device and by statistical analysis of the corresponding command lists, performance KPIs are usually calculated in a simulation environment or the development environment using the original network definition, e.g. on the source system. If such systems are used for tasks that are critical to safety, it must be ensured that the network used has the same properties (KPIs) as the original network definition, i.e. the implementations of the network on the target and source systems are intended to provide the same results for each input.

Typically, this is done using a toolchain qualification. With increasing safety requirements for the network used, however, the requirements for the certification of such a tool chain also increase. Toolchain qualification is not only very expensive and cumbersome, but can also slow down the development process.

SUMMARY

According to aspects of the disclosure, a method for verifying an implemented neural network, a method for providing a control signal, a device, a computer program and a machine-readable memory medium are proposed.

Throughout this description of the disclosure, the sequence of method steps is presented in such a way that the method is easy to follow. However, those skilled in the art will recognize that many of the method steps can also be carried out in a different order and lead to the same or a corresponding result. In this respect, the order of the method steps can be changed accordingly. Some features are numbered to improve readability or to make the assignment clearer, but this does not imply a presence of specific features.

According to one aspect of the disclosure, a method for verifying an implemented neural network is proposed. The method here has the following steps: In one step of the method, a plurality of validation images are provided. In a further step, the plurality of the validation images are fed into an original neural network (source system). In a further step, the plurality of the validation images are fed into the implemented neural network (target system). In a further step, activation coverage of the original neural network is determined by all validation images of the plurality of validation images provided. In in a further step, the determined activation coverage is compared to a target coverage. In a further step, respective output images of the original neural network resulting from the plurality of validation images are compared with respective output images of the implemented neural network resulting from the plurality of validation images in order to verify the implemented neural network.

The term validation image is to be understood broadly. In addition to images in the narrower sense of optical images, validation images are generally understood to be fields of values, such as can be described with a tensor, for example. In particular, the term validation image also includes fields of values that can be generated by RADAR sensor systems and/or LIDAR sensor systems and/or ultrasonic sensor systems and/or video systems.

In analogy to code coverage in classic unit tests, activation coverage determines a level of verification of the neural network in question to indicate the tested portion of the neural network in a set of tests applied to the neural network.

The network being tested consists of any number of layers. Each layer $L_i$ contains a number of attribute maps $F_{i,j}$. Each of these attribute maps has the dimensions $F_{i,j} = \Re^{H_{i,j} \times W_{i,j}}$. Thus, each attribute map contains a number $H_{i,j} \times W_{i,j}$ of pixels $P_{i,j,k}$. With height H and width W of the attribute map with index i of the layer and index j of the attribute map and index k of the pixels.

Activation coverage is determined by a total non-zero fraction of pixels. I.e. in other words, the activation coverage determines a ratio of the number of pixels activated for verification of the neural network to the total number of pixels.

Let $A_{i,j,k}(I)$ be the activation of a pixel $P_{i,j,k}$ for a given validation image I. The activation of a single pixel given a set of validation images $T=I_1, \ldots, I_n$, and is then defined as $$A_{i,j,k}(T) = \sum_{I \in T} A_{i,j,k}(I)$$

Finally, the activation coverage C(N, T) of a network with respect to the test set of validation images T is $$C(N, T) = \frac{\sum_{i,j,k} \delta(A_{i,j,k}(T))}{\sum_{i,j,k} 1},$$

$$\text{with } \delta(x) = \begin{cases} 0, x = 0 \\ 1, \text{otherwise} \end{cases}$$

Given a set of validation images, the resulting activations can be accumulated according to each layer and each attribute map. The resulting activation coverage is determined by counting the non-zero pixels and dividing that number by the total number of pixels.

In analogy to a line coverage in classic programming, the activation coverage quantifies the tested part of the network as a measure of the confidence in the respective verification process and allows a reduction of the number of validation images when a complete identity of the network definition or the original neural network and the implemented neural network is not to be guaranteed.

Advantageously, it is possible to secure the transfer of the network to the target system by direct verification with this method, without relying on a certified tool chain.

In other words, the implemented neural network can be verified with this method by a plurality of comparisons of the respective output images of the original neural network with the implemented neural network. I.e., the respective output images of the respective neural networks, that is, in the software and the hardware or in another target system, can be compared with the plurality of loaded verification images. If both results are identical, the implemented neural network is considered correct with respect to the test set of validation images.

In order to determine whether a utilized test set is sufficient to determine the desired level of confidence in the validation, the activation coverage can be determined according to the method.

If an implemented neural network is tested against a network definition N, or an original neural network, with a plurality of validation images $T_a$ that result in an activation coverage of $(N, T_a)=1$, the networks on the source system and target system match, at least sufficiently.

When validating a neural network N with a plurality of validation images $T_b$ yielding an activation coverage $(N, T_b)<1$, the corresponding network definition still has some untested areas and therefore the implemented neural network may generate unexpected output images, i.e. generate other results than the original network definition, if the correspondingly untested parts of the network definition are activated.

The confidence that an implemented neural network shows the same behavior as the network definition corresponding to the original neural network increases with the achieved activation coverage. Consequently, it is desirable to maximize activation coverage.

Advantageously, this verification not only relies on the creation of the implemented neural network with a qualified and trustworthy tool-chain, but, if necessary, additionally achieves secure deployment of the implemented neural network by targeted verification of the deployed network. This method can improve security when using implemented neural networks developed in a software environment by comparing individual images generated by both the original neural network and the implemented neural network, respectively, and/or the determination of activation coverage can be used to ensure that all pixels of the original neural network are addressed in the process to ensure complete verification of the implemented neural network. Since access to the attribute maps may be unique to the original neural network, activation coverage can be determined using the original neural network, since activation coverage is a property of the network and not its implementation, as described above.

That is, in other words, the plurality of validation images in this method can be chosen such that the implemented neural network can be tested and/or compared to a desired degree—corresponding to a certain activation coverage—by choosing a plurality of validation images that correspond to (achieve) the desired degree of activation coverage. The actual test/comparison is performed by processing the selected validation images with both the original and the implemented neural network, and then comparing the output images, addressing the parts specified by the coverage in both networks.

Using the plurality of validation images determined in this way, it can be ensured that an appropriately large number of paths through the network can be mapped when comparing the coverage.

According to one aspect, it is proposed that the plurality of validation images comprises a first number of test images and/or a second number of synthetically generated images.

Within this context, the term test image is to be interpreted broadly and can correspond to such images that are generated in a real environment with sensor systems of different modalities.

The term synthetically generated image is also to be interpreted broadly, and may correspond to such images when they are generated by means of calculations and/or simulations.

A plurality of validation images that has a random selection of images generated in a real environment and/or randomly synthetically generated images may result in an extent of the plurality of validation images in which validation is not feasible in practice.

In particular, synthetic images can be determined using computations such that individual pixels of the network definition are activated. This can make it permissible to generate and deploy test sets with an activation coverage of 1. This is particularly advantageous because test sets with full activation coverage with real images can only be provided in exceptional cases. Such exceptions can be networks whose complexity is low because, for example, they are very small networks. The larger a network becomes, the less likely it is to achieve high coverage without targeted image selection and/or generation of synthetic images.

According to one aspect, it is proposed that for determining activation coverage with the plurality of validation images, non-activated pixels in at least one attribute map of the original neural network are identified and compared to the total number of pixels in the at least one attribute map of the original neural network.

This aspect of the method can be advantageously used to specifically determine, control, and ensure verification of the original neural network by comparison, since, for example, some regions of the neural network may have greater importance to an output signal than other regions, according to the network topology.

According to one aspect, it is proposed that at least one, in particular each, of the synthetically generated images of the number of synthetically generated images activates at least one pixel not activated by the number of test images in at least one attribute map of the original neural network.

When using arbitrary validation images, a very large set of validation images may be required to achieve full activation coverage, i.e., activation coverage equal to 1. In order to systematically increase coverage of validation of the implemented neural network, the following can be iteratively done:

first feed an initial set of validation images $T_0$ into the network to compute the corresponding coverage $C(N, T_0)$.

for the set of validation images $T_n$ with the calculated activation coverage $C(N, T_n)$, the pixels $S_n=P_{i,j,k}$: $\delta(A_{i,j,k}(T_n))=0$ are identified, i.e. the pixels that have not been activated yet.

for each of these not yet activated pixels $P_{i,j,k} \square S_n$ a synthetic image activating this pixel is computed and added to the set of validation images $T_n$, resulting in a new set of validation images $T_{n+1}$ with their activation coverage $C(N, T_{n+1}) > C(N, T_n)$.

if the new activation coverage $C(N, T_{n+1})=1$ or if $C(N, T_{n+1})$ is large enough to provide the required reliability, the iteration can be terminated; otherwise, the pixels $S_n = P_{i,j,k}$: $\delta (A_{i,j,k}(T_n))=0$ are identified for each attribute map as above; i.e., for a number $H_{i,j} \times W_{i,j}$ of pixels $P_{i,j,k}$ that have not yet been activated with the new set of validation images $T_{n+1}$.

The implemented neural network can be verified with a plurality of validation images $T_l$ that were determined in this manner, which includes both test images and synthetic validation images systematically generated in the manner described.

Advantageously, by these systematically determined synthetic validation images, a plurality of validation images can be created for an intended verification of the implemented neural network with reduced effort, and a necessary number of the plurality of validation images can be reduced. The iterative method allows a controlled creation of the plurality of validation images corresponding to a certain (predefined) activation coverage of an original neural network.

According to one aspect, it is proposed that at least one synthetically generated validation image is generated using the following steps:

identifying at least one pixel not activated with the validation images in at least one feature map;

determining pixels of the synthetically generated validation image by inverted operations of the original neural network starting from the at least one identified pixel of the at least one attribute map that was not activated with the validation images.

In other words, this means that systematically generated validation images that activate at least one non-activated pixel in at least one attribute map of the original neural network can be created in this manner, by computing appropriate input values starting from the identified (non-activated) pixel to the input of the neural network.

According to one aspect, it is proposed that the original neural network is a convolutional neural network. With such a convolutional neural network (CNN), systematically generated synthetic validation images can in particular be determined by back-calculation.

According to one aspect, it is proposed that the original neural network is implemented as a computer program on a computer.

Advantageously, software-implemented original networks can be used to perform activation coverage and computation of systematically generated synthetic alloying images to verify neural networks that are typically implemented in a hardware.

According to one aspect, it is proposed that the implemented neural network for a processor is implemented in assembly language and/or entirely in hardware.

By implementing the neural network in this manner, the neural network can be used for different purposes in a way that conserves resources and optimizes speed.

According to one aspect of the method, it is proposed that the implemented neural network is verified with tool chains. The combination of the described method for verification can be advantageously verified with tool chains to compare the results and/or improve the verification.

A method is proposed wherein, based on an implemented neural network verified with one of the methods described above, a control signal for controlling an at least partially automated vehicle is provided; and/or based on the verified implemented neural network, a warning signal for warning a vehicle occupant is provided.

The term "based on" is to be understood broadly with respect to the attribute that a control signal is provided based on a verified implemented neural network. It is to be understood in that the verified, implemented neural network is used for any determination or calculation of a control signal, wherein this does not exclude other input variables from also being used for this determination of the control signal. The same applies correspondingly to the provision of a warning signal.

Such a control signal can be used to initiate a transition to a safe state in highly automated systems. For example, in an at least partially automated vehicle, this can lead to a slow stop on a shoulder.

A device is proposed which is designed to perform any of the above-described methods. Such a device allows the use of at least one of the described methods in different systems.

It is proposed to use the aforementioned device to verify an implemented neural network which is intended for use with an at least partially automated mobile platform.

A computer program is disclosed that includes commands which, when the computer program is executed by a computer, cause the computer program to perform any of the methods described above. Such a computer program enables the described method to be used in different systems.

A machine-readable memory medium is specified, on which the above-described computer program is stored. Such a machine-readable memory medium makes the above-described computer program portable.

BRIEF DESCRIPTION OF THE DRAWINGS

Embodiment examples of the disclosure are shown with reference to FIGS. 1 to 3 and will be explained in more detail in the following. Shown are.

DETAILED DESCRIPTION

Figure 1:
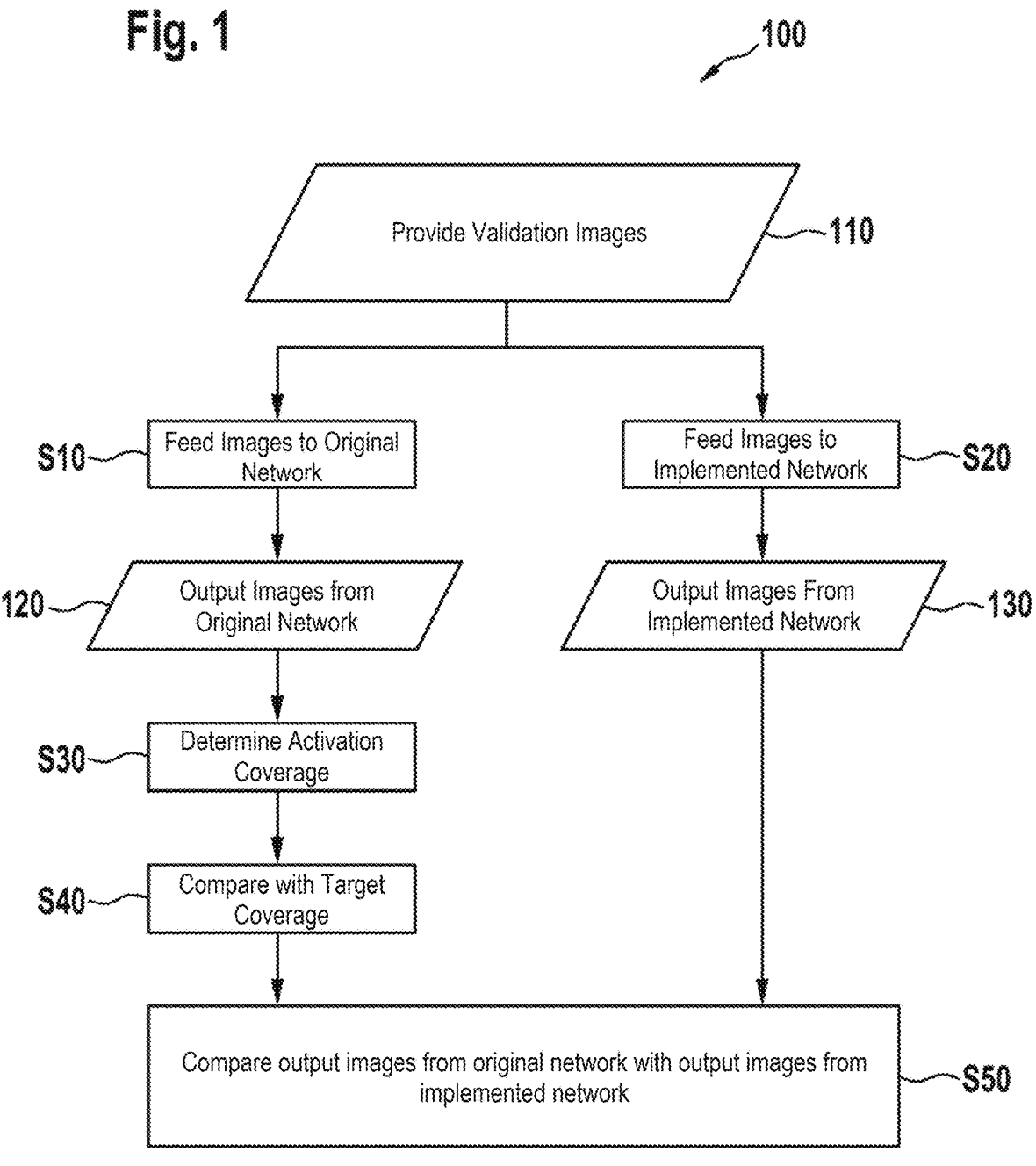
FIG. 1 a flowchart of the method for verifying an implemented neural network.

FIG. 1 outlines a flowchart of the method 100 for verifying an implemented neural network.

In one step of the method 100, a plurality of validation images 110 are provided. In a further step S10, the plurality of validation images 100 are fed into an original neural network. In a further step S20, the plurality of the validation images 100 are fed into the implemented neural network. In a further step S30, an activation coverage of the original neural network by all validation images of the provided plurality of validation images 100 is determined. In a further step S40, the determined activation coverage is compared to a target coverage. In a further step S50, respective output images 120 from the original neural network that result from the plurality of the validation images are compared with respective output images 130 of the implemented neural network resulting from the plurality of validation images 100 for verification of the implemented neural network, for example according to a bit identity.

Figure 2:
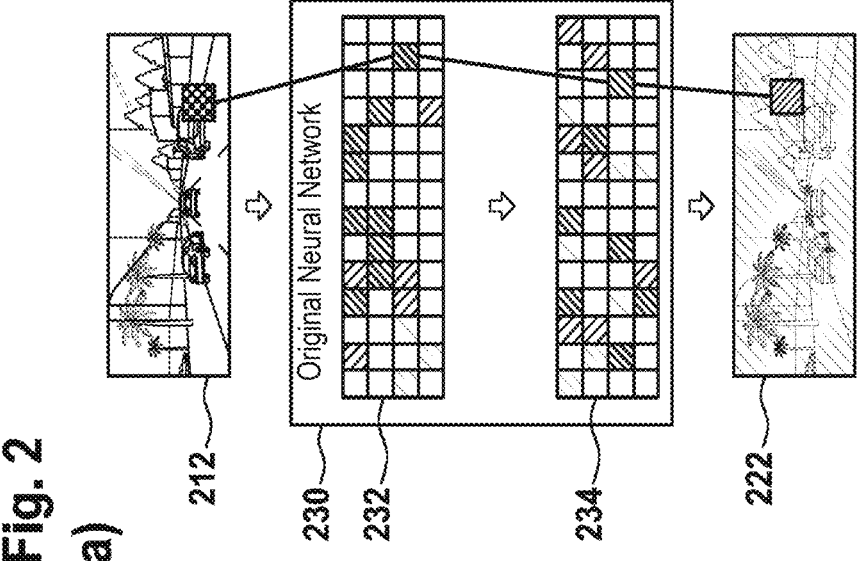
FIG. 2a, b a, a concept of activation coverage of the method.
Figure 2:
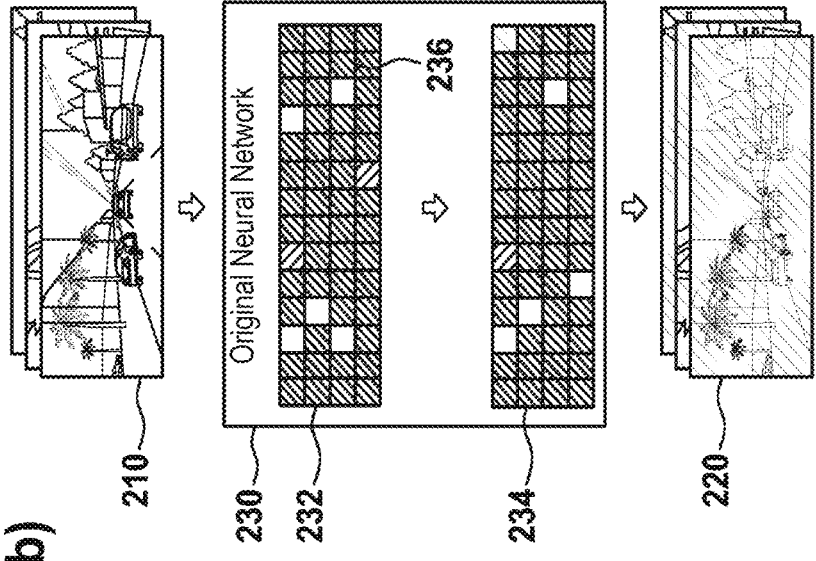

FIG. 2a outlines the concept of activation coverage of an original neural network 230 with an exemplary input image 212 and an output image 222. The input image 212 activates: $\{F_{1,1}, F_{1,2}, F_{1,3}, F_{1,4}\}$ and a second layer with the attribute maps 234 L2: $\{F_{2,1}, F_{2,2}, F_{2,3}, F_{2,4}\}$ a number of 38 of the 112 total attribute map pixels, i.e. pixels with activation greater than zero, in the original neural network 230 with a first layer 232 containing the attribute maps L1. Thus, the activation coverage of the original neural network is 230: 38/112=33.9%.

FIG. 2b outlines the concept of activation coverage of an original neural network 230 having a plurality of input images 210 and a corresponding plurality of output images 220. The input images 210, in the original neural network 230 with the first layer 232 containing the attribute maps L1: $\{F_{1,1}, F_{1,2}, F_{1,3}, F_{1,4}\}$ and the second layer 234 and the attribute maps L2: $\{F_{2,1}, F_{2,2}, F_{2,3}, F_{2,4}\}$, successively activate the pixels in the respective attribute map, which are accumulated accordingly. The resulting activation coverage is determined by counting the pixels with non-zero activation and dividing this quantity by the total number of pixels. The example shows an activation coverage of: (112–10)/ 112=91.1%

Figure 3:
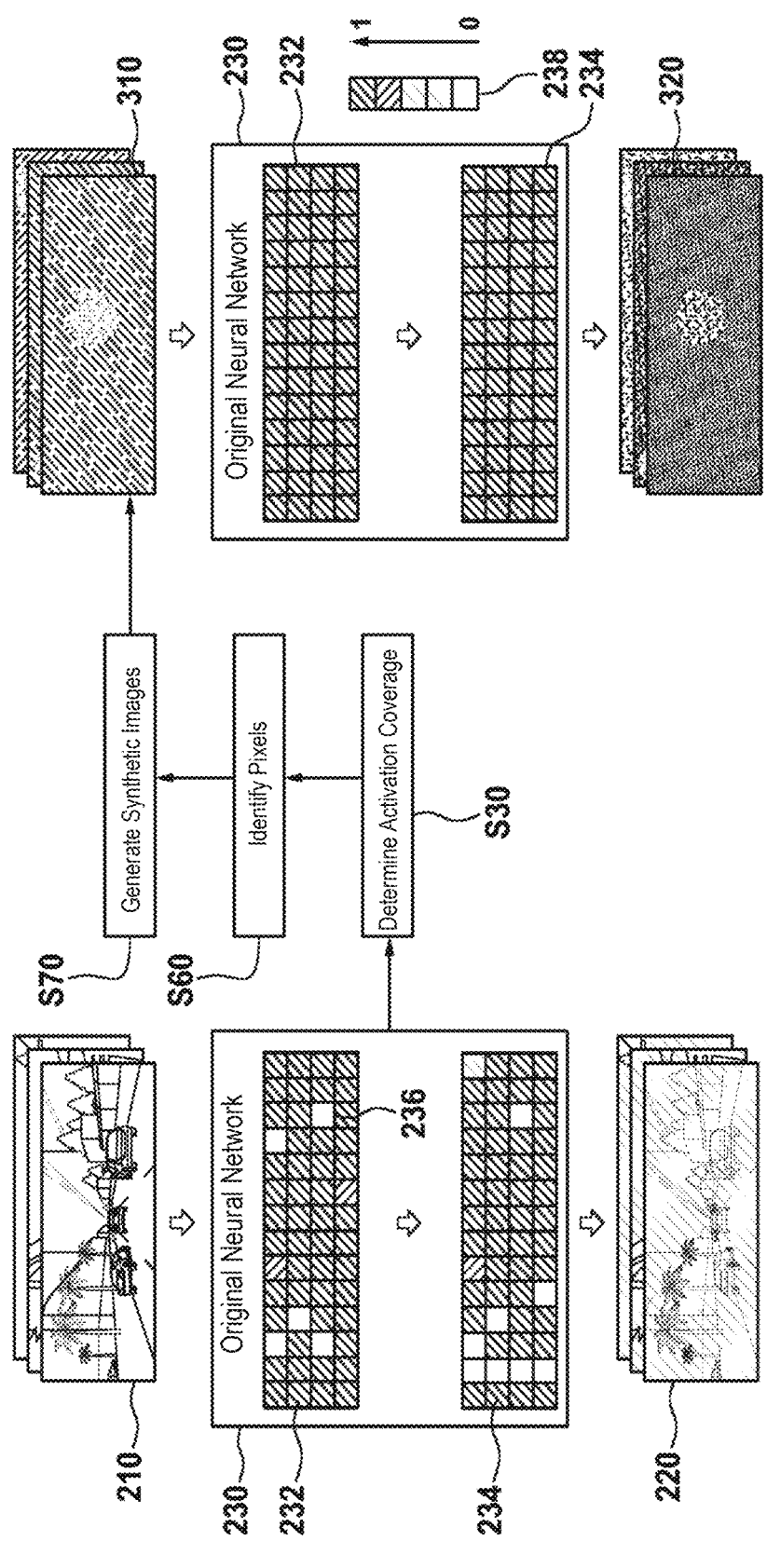
FIG. 3 an activation coverage in a validation of a two-layer neural network with systematically generated synthetic validation images.

FIG. 3 schematically outlines an activation coverage of a two-layer neural network 230 with four features L1: $\{F_{1,1}, F_{1,2}, F_{1,3}, F_{1,4}\}$, L2: $\{F_{2,1}, F_{2,2}, F_{2,3}, F_{2,4}\}$ per layer 232, 234.

As explained in FIG. 2a, a single validation image yields an activation coverage of 33.9% as an example.

For a plurality of validation images 210, there is an activation coverage of 91.1%, which is determined in a step S30. In one step of the method S60, the pixels of the attribute map that have not been activated are identified. In a step S70, synthetic validation images 310 are systematically generated to activate the identified non-activated pixels of the respective attribute maps. By applying these systematically generated synthetic validation images 310, a 100% activation coverage of the neural network 230 is achieved, and the corresponding output images 320 are generated using the neural network 230. Scale 283 is used to explain the activation of each pixel of the attribute maps between an activation of zero and an activation of one.

In other words, the overall result for the verification of the implemented neural network is a plurality of validation images $T_j$, which includes both test images and systematically generated synthetic images. According to FIG. 3, a total of 10 pixels were not activated by an initial set of validation images including, for example, only test images. For each of the pixels determined to be non-activated, a synthetic validation image that correspondingly activates these previously non-activated pixels and adds them to the plurality of validation images can be generated. A synthetic validation image herein activates one previously non-activated pixel or a number of previously non-activated pixels. This makes it possible to achieve maximum activation coverage. In the example of FIG. 3, this results in an activation coverage of 100%.

The invention claimed is:

1. A method for verifying an implemented neural network, the implemented neural network being an implementation of an original neural network, which has been adapted for operation on embedded hardware of a target system, comprising:

providing a plurality of validation images;

feeding the plurality of validation images to the original neural network to generate a first plurality of output images;

feeding the plurality of validation images to the implemented neural network to generate a second plurality of output images;

determining an activation coverage of the original neural network by all validation images of the provided plurality of validation images;

comparing the determined activation coverage to a target coverage; and verifying the implemented neural network by comparing respective output images of the first plurality of output images with respective output images of the second plurality of output images.

2. The method according to claim 1, wherein the plurality of validation images includes a first number of test images and/or a second number of synthetically generated images.

3. The method according to claim 2, wherein non-activated pixels in at least one feature map of the original neural network are identified for the determination of the activation coverage with the plurality of validation images and with a total number of pixels in the at least one feature map of the original neural network is compared.

4. The method according to claim 3, wherein at least one of the synthetically generated validation images of the second number of synthetically generated images activates at least one pixel in at least one feature map of the original neural network that is not activated by the first number of test images.

5. The method according to claim 3, wherein generating at least one of the synthetically generated images comprises:

identifying at least one pixel not activated with the plurality of validation images in the at least one feature map; and determining pixels of the synthetically generated validation image by inverse operations of the original neural network based on the at least one identified pixel of the at least one feature map that was not activated with the validation images.

6. The method according to claim 1, wherein the original neural network is a convolutional neural network.

7. The method according to claim 1, further comprising: implementing the original neural network as a computer program on a computer.

8. The method according to claim 1, wherein the implemented neural network is for a processor and is implemented in an assembly language and/or entirely in hardware.

9. The method according to claim 1, further comprising: verifying the implemented neural network with tool chains.

10. The method according to claim 1, wherein, based on the verified implemented neural network, a control signal for controlling an at least partially automated vehicle is provided, and/or a warning signal for warning a vehicle occupant is provided.

11. The method according to claim 1, wherein a device is set up to carry out the method.

12. The method according to claim 11, wherein the device is used to verify the implemented neural network that is provided for use with an at least partially automated mobile platform.

13. The method according to claim 1, wherein the method is performed by executing instructions of a computer program stored on a non-transitory machine-readable storage medium.

* * * * *